(12) United States Patent
Kuroda

(10) Patent No.: US 7,409,607 B2
(45) Date of Patent: Aug. 5, 2008

(54) MEMORY ADDRESS GENERATING APPARATUS, PROCESSOR HAVING THE SAME, AND MEMORY ADDRESS GENERATING METHOD

(75) Inventor: Takashi Kuroda, Gunma (JP)

(73) Assignee: Sanyo Electric Co., Ltd., Osaka (JP)

( * ) Notice: Subject to any disclaimer, the term of this patent is extended or adjusted under 35 U.S.C. 154(b) by 290 days.

(21) Appl. No.: 11/279,204

(22) Filed: Apr. 10, 2006

(65) Prior Publication Data

US 2006/0282752 A1 Dec. 14, 2006

(30) Foreign Application Priority Data

Apr. 11, 2005 (JP) .............................. 2005-113051

(51) Int. Cl.
*G11C 29/00* (2006.01)
(52) U.S. Cl. ...................................... 714/702; 711/202
(58) Field of Classification Search ................. 711/211, 711/218, 220, 202; 710/22; 714/702
See application file for complete search history.

(56) References Cited

U.S. PATENT DOCUMENTS

| | | | | |
|---|---|---|---|---|
| 5,712,999 | A * | 1/1998 | Guttag et al. ................ | 711/211 |
| 6,260,082 | B1 * | 7/2001 | Barry et al. .................... | 710/22 |
| 6,681,346 | B2 * | 1/2004 | James et al. ................... | 714/42 |
| 7,188,231 | B2 * | 3/2007 | Vavro .......................... | 711/218 |
| 2006/0047937 | A1 * | 3/2006 | Selvaggi et al. .............. | 711/220 |

FOREIGN PATENT DOCUMENTS

JP  6-337812  6/1994

* cited by examiner

*Primary Examiner*—David Ton
(74) *Attorney, Agent, or Firm*—Fish & Richardson P.C.

(57) ABSTRACT

A memory address generating apparatus comprising an address converting circuit, after setting a first setting region storing substitution source data and a second setting region storing substitution destination data that are a substitution target of the substitution source data in an address space provided by the memory, if a specified address specified by the processor as the access destination to the memory is included between a first beginning address and an end address of the first setting region, changing the specified address to a substitution destination address generated by adding a difference between the specified address and the first beginning address to a second beginning address of the second setting region.

11 Claims, 6 Drawing Sheets

MEMORY ADDRESS GENERATING APPARATUS, PROCESSOR HAVING THE SAME, AND MEMORY ADDRESS GENERATING METHOD

CROSS-REFERENCE TO RELATED APPLICATIONS

The present application claims priority from Japanese Patent Application No. 2005-113051 filed on Apr. 11, 2005, which is herein incorporated by reference.

BACKGROUND OF THE INVENTION

1. Field of the Invention

The present invention relates to a memory address generating apparatus, a processor having the same, and a memory address generating method.

2. Description of the Related Art

An accessible memory such as a program memory or a data memory is incorporated in or attached externally to a microcomputer or a processor that performs a signal process such as a DSP. Addressing modes of processor for accessing such a memory include a direct addressing mode, an indirect addressing mode, a relative addressing mode, a base addressing mode, etc. Therefore, to achieve these addressing modes, the processor is equipped with a memory address generating apparatus that generates addresses for accessing the memory. See for example Japanese Patent Application Laid-Open Publication No. H06-337812.

By the way, as the processor is required to perform more sophisticated and complicated processes, the memory is required to store more volume of data, which is continuously increasing year by year. Under such a situation, for example, in one of the processors, DSP (Digital Signal Processor), when a digital filter calculation (FIR (Finite Impulse Response), IIR (Infinite Impulse Response), etc.) is performed which includes multiplication, accumulation, etc., while the same multiplier and adder are used, a plurality of processes is performed by dynamically switching the filter coefficients of the digital filter calculation. In this case, the filter coefficients include a mixture of static data that will be common contents in a plurality of processes and dynamic data that will be different contents in a plurality of processes. Therefore, while the processor stores the static data and dynamic data for each of a plurality of processes in the memory, this is redundant and contributes to the increase of the usage capacity of the memory, since a plurality of the static data is stored in the memory although the static data have the common contents for each process.

Additionally, for example, if the memory is a mask ROM, a bug may be discovered in a program stored in the mask ROM or the program contents may be changed along with the change in the system specification after the mask ROM is manufactured. In such a case, since the mask ROM is difficult to rewrite for debugging or changing the program because of the nature of the mask ROM, the bug or the unchanged program is stored in the mask ROM without modification. This also contributes to the increase of the usage capacity of the memory.

SUMMARY OF THE INVENTION

In order to solve the above problem, one aspect of the present invention provides a memory address generating apparatus that is disposed in a processor, the memory address generating apparatus generating an address of an access destination to a memory that is accessible by the processor, the memory address generating apparatus comprising an address converting circuit, after setting a first setting region storing substitution source data and a second setting region storing substitution destination data that are a substitution target of the substitution source data in an address space provided by the memory, if a specified address specified by the processor as the access destination to the memory lies between a first beginning address and an end address of the first setting region, changing the specified address to a substitution destination address generated by adding a difference between the specified address and the first beginning address to a second beginning address of the second setting region, wherein if the specified address lies between the first beginning address and the end address, the substitution destination data in the second setting region corresponding to the substitution destination address is substituted for the substitution source data in the first setting region corresponding to the specified address.

According to the above aspect of the present invention, there can be provided a memory address generating apparatus, a processor having the same, and a memory address generating method that can efficiently use a memory storage capacity.

BRIEF DESCRIPTION OF THE DRAWINGS

The above and other aspects, features and advantages of the present invention will become more apparent from the following detailed description when taken in conjunction with the accompanying drawings, in which.

DETAILED DESCRIPTION OF THE INVENTION

<Overall Configuration of Processor>

Figure 1:
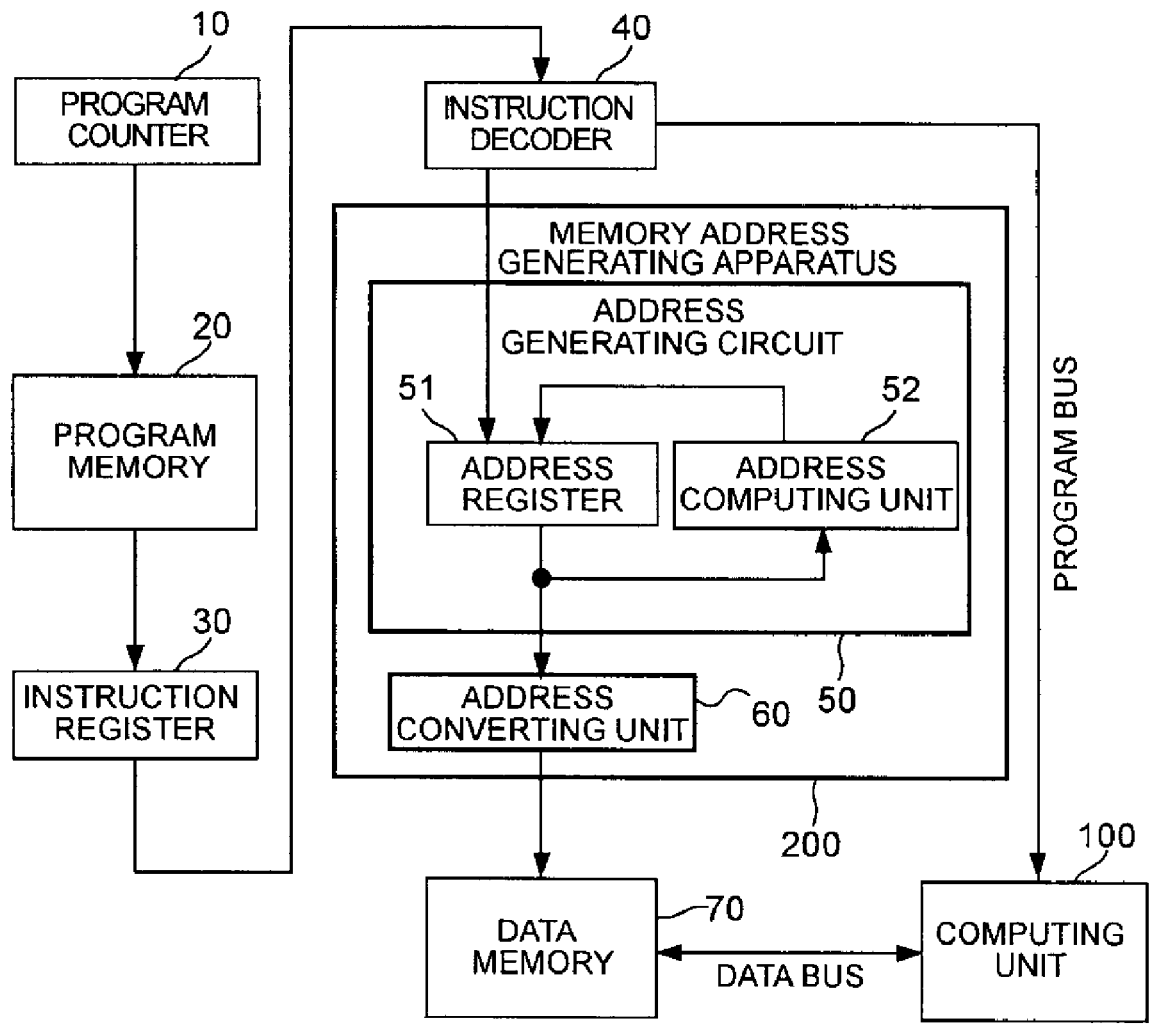
FIG. 1 shows an overall configuration of a processor according to one implementation of the present invention.

FIG. 1 shows an example of an overall configuration of a "processor" according to the present invention. Although the processor is a DSP in the following description, the processor may be other microcomputers, ASIC (Application Specific IC), etc. The DSP is a microprocessor specialized for digital signal processes and is used for digital signal processes in a wide range of fields such as audio, communication, measurement, image, and acoustic fields. The DSP is equipped with a hardware multiply accumulator (MAC) for performing multiplication and accumulation frequently used in the digital signal process at high speed and is characterized by parallel processing that executes a plurality of processes with one instruction, the Harvard architecture that separates a program memory from a data memory, etc. Since the DSP basically operates at high speed, the program memory and data memory capable of high-speed access are incorporated into the DSP, rather than attached externally.

The processor shown in FIG. 1 is mainly constituted by a program counter 10, a program memory 20, an instruction register 30, an instruction decoder 40, a memory address generating apparatus 200, a data memory 70, a computing unit 100 and further includes I/O ports and various registers (not shown).

The program counter 10 is a counter that sequentially sets program addresses for specifying locations where programs to be executed are stored. The program memory 20 is generally constituted by a ROM (such as EEPROM) and is a memory that stores the instruction codes of the program. The instruction register 30 is a register that temporarily store the instruction code fetched from the program memory 20. The instruction decoder 40 is a decoder that decodes the instruction code stored in the instruction register 30.

The memory address generating apparatus 200 is one implementation of a "memory address generating apparatus" according to the present invention. The memory address generating apparatus 200 includes an address generating circuit 50 and an address converting circuit 60 and basically generates addresses indicating the access destinations on the data memory 70. The address space provided by the data memory 70 is assumed to be configured with a normal access region 701 where normal access is performed, a substitution source region 702 ("first setting region") storing substitution source data, and a substitution destination region 703 ("second setting region") storing substitution destination data that are the target of the substitution of the substitution source data. See FIG. 4.

The address generating circuit 50 generates addresses of the access destinations for the data memory 70 (hereinafter, "specified address") based on the decoding result of the instruction code in the instruction decoder 40. Employed addressing modes can include a direct addressing mode, an indirect addressing mode, a relative addressing mode, a base addressing mode, etc. The present invention employs the relative addressing mode, and the address generating circuit 50 stores a loop start address indicating an access start location of the data memory 70 in the address register 51 and increases/decreases the loop start address stored in the address register 51 with an address computing unit 52 by a predetermined step value in loop calculations to generate the specified addresses sequentially. It should be noted the present invention should not be construed limitative to the above.

The address converting circuit 60 is one implementation of an "address converting circuit" according to the present invention. If the specified address generated in the address generating circuit 50 is included between an OLB (Overlay begin) address ("first beginning address") applied to the beginning position of the substitution source region 702 and an OLE (Overlay End) address (end address) applied to the end position of the substitution source region 702, the address converting circuit 60 changes the specified address to a substitution destination address that is generated by adding a difference between the specified address and the OLB address to an OLC (Overlay Convert begin) address ("second beginning address") applied to the beginning position of the substitution destination region 703. The processor reads the specified substitution destination data from the substitution destination region 703 of the data memory 70 based on this substitution destination address and, as a result, the substitution destination data of the substitution source region 703 corresponding to the substitution destination address is substituted for the substitution source data of the substitution source region 702 corresponding to the specified address. On the other hand, if the specified address is not included between the first beginning address applied to the substitution source region 702 and the end address, the specified address is not converted to the substitution destination address, and access to the normal access region 701 of the data memory is performed using the specified address specified by the processor without modification. In this way, the storage capacity provided by the data memory 70 can be used efficiently. For example, if the access to the data memory 70 is performed for a data group with a predetermined capacity such as a block or a page, the data grope corresponding to the substitution source data can be replaced as a whole efficiently.

The data memory 70 is a memory that stores data for the calculation based on the instruction code decoded in the instruction decoder 40. The data memory 70 is constituted by ROM, RAM, or the combination thereof. As described above, the address space provided by the data memory 70 is configured with the normal access region 701, the substitution source region 702, and the substitution destination region 703.

Figure 2:
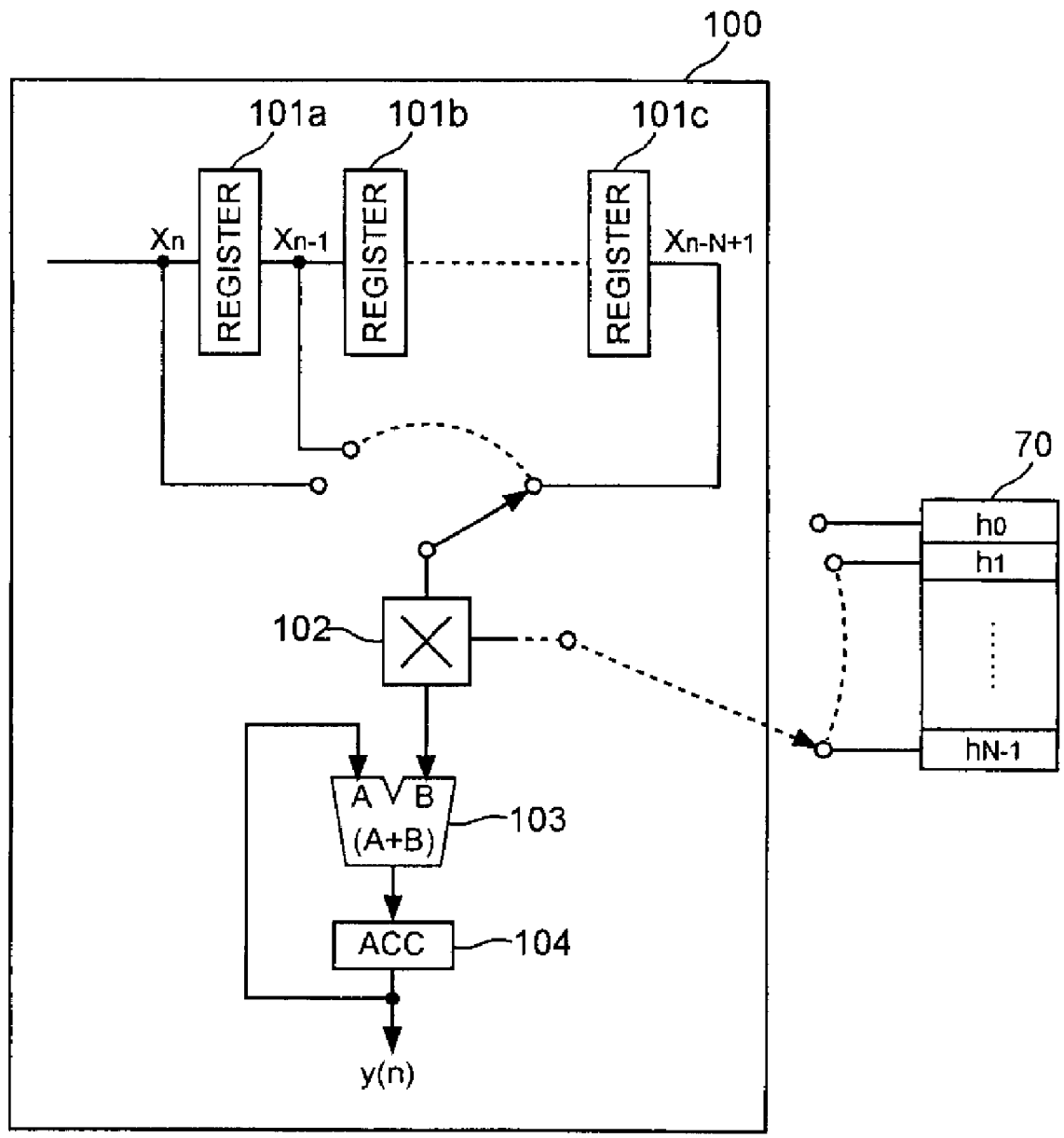
FIG. 2 shows a configuration of a computing unit according to one implementation of the present invention.

The computing unit 100 performs calculations (multiplication, accumulation, etc.) with the use of the data read from the data memory 70. For example, the computing unit 100 is hardware that achieves a convolution calculation, which is a basic calculation of a digital filter, as shown in FIG. 2. The convolution calculation is expressed as "$y(n)=\Sigma h(k) \times (n-k)$, where k=0 to N−1".

In FIG. 2, every time an input signal x(n−k) is sequentially input to registers 101a, 101b, ..., 101c, the tap outputs of the registers 101a, 101b, ..., 101c is switched sequentially from x(n−N+1), which is most delayed, to x(n) and supplied to one input terminal of the multiplier 102. The filter coefficients are supplied to the other input terminal of the multiplier 102 sequentially from h(N−1) to h(0) in a synchronized manner. Multiplication results of the multiplier 102 are sequentially supplied to one input terminal of an adder 103. The other input terminal of the adder 103 is sequentially supplied with previous accumulation results of the adder 103 stored in an ACC (Accumulator) 104. As a result, new accumulation results of the adder 103 are sequentially stored in the ACC 104. The convolution calculation is completed by performing such an operation for N times.

<Configuration of Memory Address Generating Apparatus>

Figure 3:
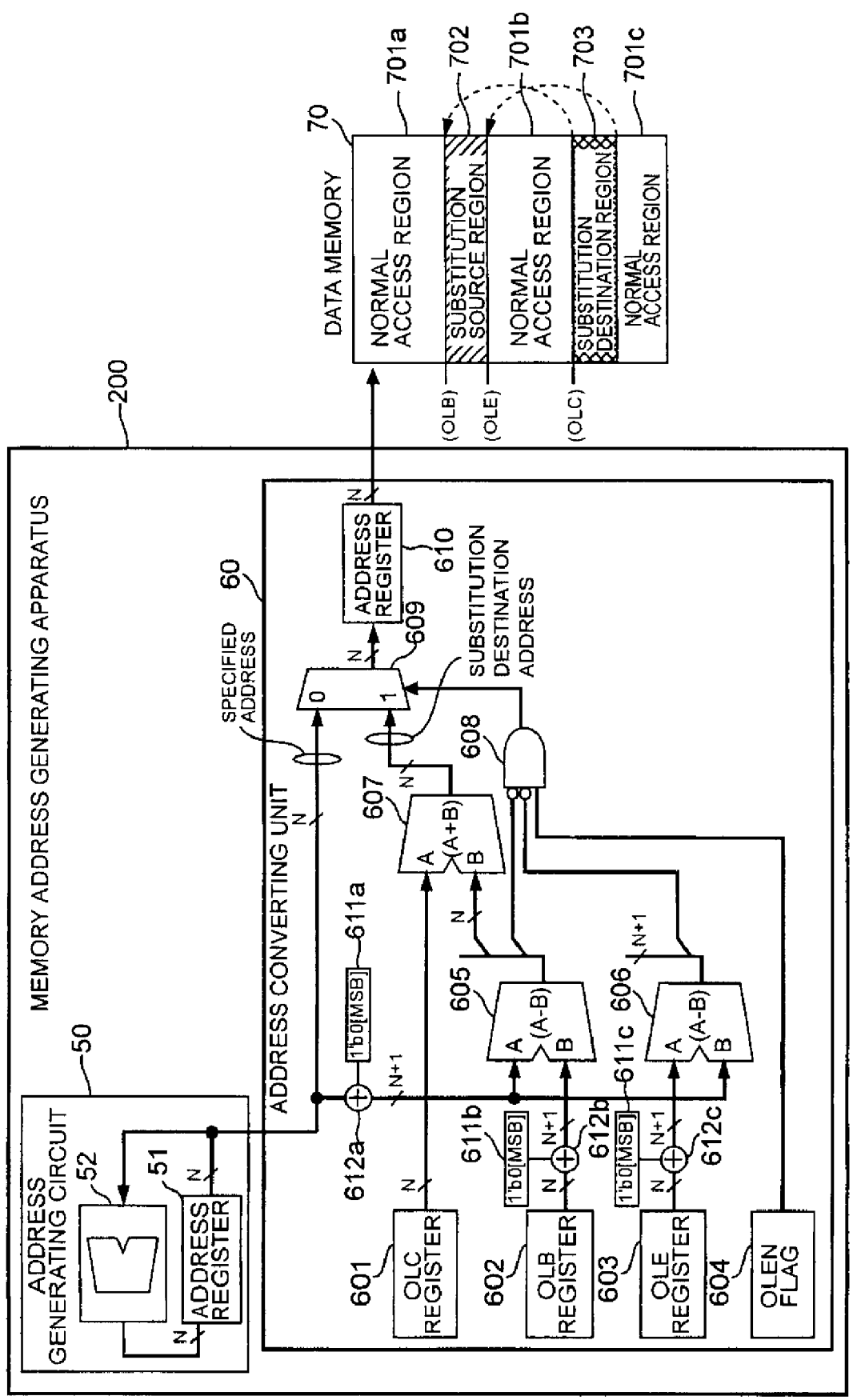
FIG. 3 shows a configuration of a memory address generating apparatus according to one implementation of the present invention.

FIG. 3 shows a configuration of the memory address generating apparatus 200.

The address space provided by the data memory 70 is configured with the substitution source region 702 identified by the OLB address indicating a beginning position and the OLE address indicating the end position, and the substitution destination region 703 having the same capacity as the substitution source region 702 and identified by the OLC address indicating the beginning position. Since the substitution source region 702 and the substitution destination region 703 have the same capacity, the substitution destination region 703 is identified only by the OLC address indicating the beginning position. Therefore, an address indicating the end position of the substitution destination region 703 is not needed in the arrangement of the address conversion according to the present invention, which simplifies a configuration of the address converting circuit 60.

The address space provided by the data memory 70 is assumed to be configured with a normal access region 701a provided with an address preceding to the OLB address indicating the beginning position of the substitution source region 702, a normal access region 701b provided with an address between the OLE address indicating the end position of the substitution source region 702 and the OLC address indicating the beginning position of the substitution destination region 703, and a normal access region 701c provided with an address subsequent to the address indicating the end position of the substitution destination region 703. As described later, the substitution source region 702 and the substitution destination region 703 may be overlapped and, in this case, the normal access region 701b is not set.

As described above, the address generating circuit 50 generates the specified address that specifies the access destination on the data memory 70.

As described above, the address converting circuit 60 sets whether the specified address generated in the address generating circuit 50 is converted to the substitution destination address for output or the specified address generated in the address generating circuit 5 is output without modification.

An OLC register 601 ("third address register") is an address register that stores the OLC address; an OLB register 602 ("first address register") is an address register that stores the OLB address; and an OLE register 603 ("second address register") is an address register that stores the OLE address. The contents of the OLC register 601, OLB register 602, and the OLE register 603, i.e., the OLC address, the OLB address, and the OLE address can be freely rewritten by an external microcomputer, etc. connected communicably with the DSP at any time (e.g., when the DSP is initialized or during the execution of the program). That is, in the address space of the data memory 70, the setting positions and capacities of the substitution source region 702 and the substitution destination region 703 can be freely set. As a result, a degree of freedom of the address conversion according to the present invention is improved.

An OLEN (Overlay Enable) flag register 604 ("enable flag register") is a control register that stores an enable flag (1: enable, 0: disable) for setting whether the address conversion according to the present invention, i.e., the substitution of the substitution destination data for the substitution source data is performed or not. The contents of the OLEN flag register 604, i.e., the enable flag can also be freely rewritten by an external microcomputer, etc. connected communicably with the DSP at any time. As a result, the address conversion according to the present invention can be performed when needed, such as when the coefficient is switched or when a bug is corrected during the execution of the program.

A subtracter 605 ("first subtracter") calculates "specified address–OLB address", which is a difference between the specified address generated in the address generating circuit 50 and the OLB address stored in the OLB register 602 ("first difference"). That is, a sign bit indicating positive and negative based on the difference "specified address–OLB address" is information for determining whether the specified address is located before or after the OLD address. The difference "specified address–OLB address" also is information for generating the substitution destination address.

A subtracter 606 ("second subtracter") calculates "OLE address–specified address", which is a difference between the OLE address stored in the OLE register 603 and the specified address generated in the address generating circuit 50 ("second difference"). That is, a sign bit indicating positive and negative based on the difference "OLE address–specified address" is information for determining whether the specified address is located before or after the OLE address.

An adder 607 adds the OLC address stored in the OLC register 601 to the difference "specified address–OLB address" of the subtracter 605 to generate the addition result "OLC address+specified address–OLB address", which is the substitution destination address.

A selecting circuit 609 selects either the specified address generated in the address generating circuit 50 or the substitution destination address generated in the adder 607 based on output of an AND element 608. The specified address or the substitution destination address selected by the selecting circuit 609 is stored in an address register 610 temporarily and is then supplied to the data memory 70. As a result, the access to the data memory 70 is performed based on the specified address or the substitution destination address selected by the selecting circuit 609.

The AND element 608 is one implementation of a "selection control circuit" according to the present invention. The AND element 608 determines whether or not the specified address generated in the address generating circuit 50 is included between the OLB address and the OLE address, based on the sign bit of the difference "specified address–OLB address" of the subtracter 605 and the sign bit of the difference "OLE address–specified address" of the subtracter 606. Describing in detail, one combination is determined among the following three combinations.

1. If the specified address is located before the OLB address:
   the sign bit of the difference "specified address–OLB address" of the subtracter 605 is negative; and
   the sign bit of the difference "OLE address–specified address" of the subtracter 606 is positive.

2. If the specified address is located between the OLB address and the OLE address:
   the sign bit of the difference "specified address–OLB address" of the subtracter 605 is positive; and
   the sign bit of the difference "OLE address–specified address" of the subtracter 606 is positive.

3. If the specified address is located after the OLB address:
   the sign bit of the difference "specified address–OLB address" of the subtracter 605 is positive; and
   the sign bit of the difference "OLE address–specified address" or the subtracter 606 is negative.

Therefore, if both of the sign bits of the differences of the subtracters 605, 606 are positive (0), the AND element 608 determines that the specified address is located between the OLB address and the OLE address and performs control to make the selecting circuit 609 select the substitution destination address, which is the addition result of the adder 607. On the other hand, if both of the sign bits of the differences of the subtracters 605, 606 are not positive, the AND element 608 determines that the specified address is not located between the OLB address and the OLE address and performs control to make the selecting circuit 609 select the specified address generated in the address generating circuit 50.

The AND element 608 enables the selection of the specified address or the substitution destination address in the selecting circuit 609 based on the enable flag stored in the OLEN flag register 604 if the enable flag indicates that the address conversion according to the present invention, i.e., the substitution of the substitution destination data for the substitution source data is performed (1: enable). On the other hand, if the enable flag indicates that the address conversion according to the present invention, i.e., the substitution of the substitution destination data for the substitution source data is not performed (0: disable), the AND element 608 enables only the selection of the specified address in the selecting circuit 609.

Figure 4:
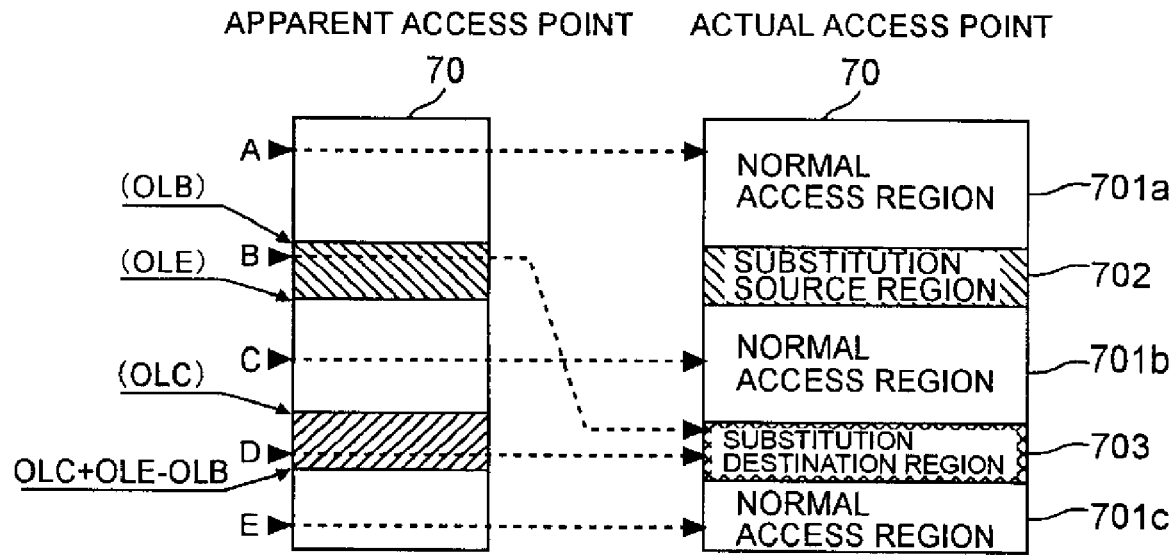
FIG. 4 is a diagram for describing the address conversion according to one implementation of the present invention.

The memory address generating apparatus 200 performs the access as shown in FIG. 4 with the configuration described above first. The left side of FIG. 4 shows the positions of the specified addresses generated in the address generating circuit 50 (apparent access points). The right side of FIG. 4 shows the positions of the specified addresses or the substitution destination addresses selected by the selecting circuit 609 (actual access points).

That is, as shown in FIG. 4, in the case of a specified address A located before the OLB address, the normal access region 701a is accessed at the specified address A without modification. In the case of a specified address B included between the OLB address and the OLE address, the substitution destination region 703 is accessed at the substitution destination address generated by adding the OLC address to the difference between the specified address B and the OLB address. In the case of a specified address C located between the OLE address and the OLC address, the normal access region 701c is accessed at the specified address C without modification. In the case of a specified address D included between the OLC address and (OLC address+OLE address−OLE address), the substituted destination region 703 is accessed at the specified address D without modification. In the case of a specified address E located after (OLC address+OLE address−OLB address) the normal access region 701c is accessed at the specified address E without modification. With such an arrangement of the memory address generating apparatus 200, the storage capacity provided by the data memory 70 can be used efficiently.

Figure 5:
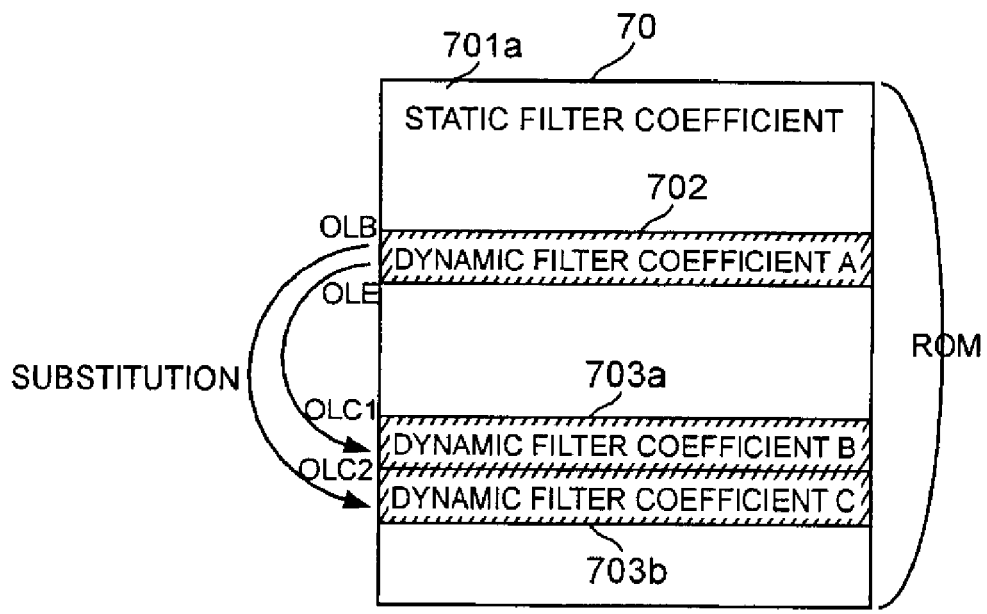
FIG. 5 is a diagram for describing a specific example of the address conversion according to one implementation of the present invention.

The arrangement of the memory address generating apparatus 200 described above can be utilized in the case of dynamic data substitution as shown in FIG. 5, for example. In this case, for example, it is assumed that a plurality of digital filter processes performed by the DSP uses a filter coefficient that is static and is not needed to be changed when each process is switched since the contents are common (hereinafter, "static filter coefficient") and filter coefficients that are dynamic and are needed to be changed when each process is switched since the contents are different (hereinafter, "dynamic filter coefficient").

In this case, the address space provided by the data memory 70 is assumed to be configured with only the address space of the ROM and, as a result, it is assumed that the substitution source region 702, the substitution destination region 703, and the normal access region 701 are all set within the address space of the ROM. The normal access region 701a stores the static filter coefficient; the substitution source region 702 stores a representative dynamic filter coefficient A of a plurality of the dynamic filter coefficients; and the substitution destination regions 703a and 703b set by the OLC address B and the OLC address C store dynamic filter coefficients B and C, respectively, which are not representative coefficients of the plurality of the dynamic filter coefficients.

In this case, when the dynamic filter coefficient used in the process is switched as the digital filter process is switched, if the specified address is included between the OLB address indicating the beginning position of the substitution source region 702 and the OLE address indicating the end position thereof, the DSP substitutes the dynamic filter coefficients B, C stored in the substitution destination region 703a, 703b corresponding to the substitution destination addresses for the dynamic filter coefficient A stored in the substitution source region 702 corresponding to the specified address. In this way, since the static filter coefficient is not needed to be stored for each of a plurality of digital filter processes, the storage capacity provided by the data memory 70 can be used efficiently.

The arrangement of the memory address generating apparatus 200 described above, especially, the arrangement of the address converting circuit 60 can be applied not only to the access to the data memory 70 but also to the access to the program memory 20. This can be achieved by providing an arrangement similar to the address converting circuit 60 between the program counter 10 and the program memory 20.

Figure 6:
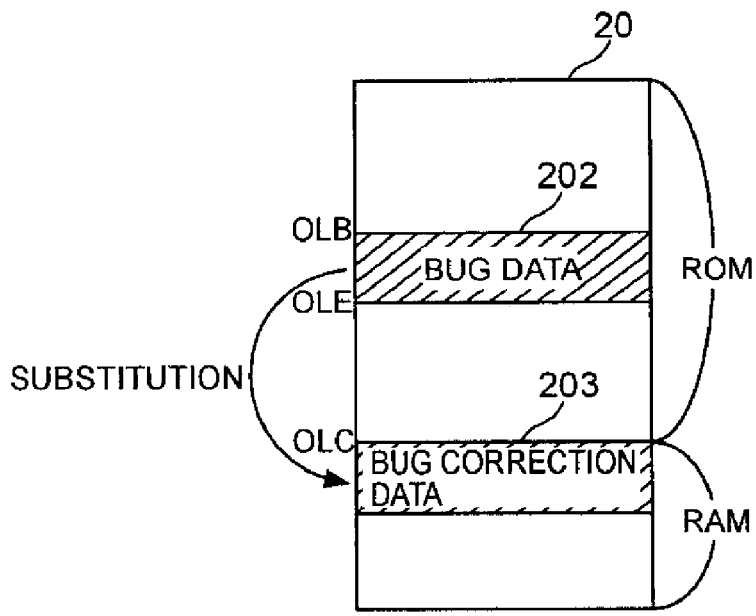
FIG. 6 is a diagram for describing a specific example of the address conversion according to one implementation of the present invention.

For example, as shown in FIG. 6, it is assumed that the address space provided by the program memory 20 is constituted by combining the address space provided by the ROM and the address space provided by the RAM. It is assumed that a substitution source region 202 is set within the address space of the ROM and that a substitution destination region 203 is set within the address space of the RAM. It is assumed that the substitution source data stored in the substitution source region 202 are bug data of a region where a bug is created and that the substitution destination data stored in the substitution destination region 203 are bug correction data with the bug corrected.

In this case, if the specified address is included between the OLB address indicating the beginning position of the substitution source region 202 storing the bug data and the OLE address indicating the end position thereof, the DSP changes the specified address to the substituted destination address. The DSP accesses to the substitution destination address 203 based on this substituted destination address and, as a result, the bug correction data of the substitution destination region 203 corresponding to the substitution destination address is substituted for the bug data of the substitution source region 202. In this way, when the content of the program of the ROM is needed to be rewritten, even if it is difficult to rewrite the ROM, the storage capacity provided by the data memory 20 can be used efficiently without changing the mask or correcting the system program.

<MSB Extension>

<<When No Problem Occurs Even If MSB Is Not Extended>>

Figure 7:
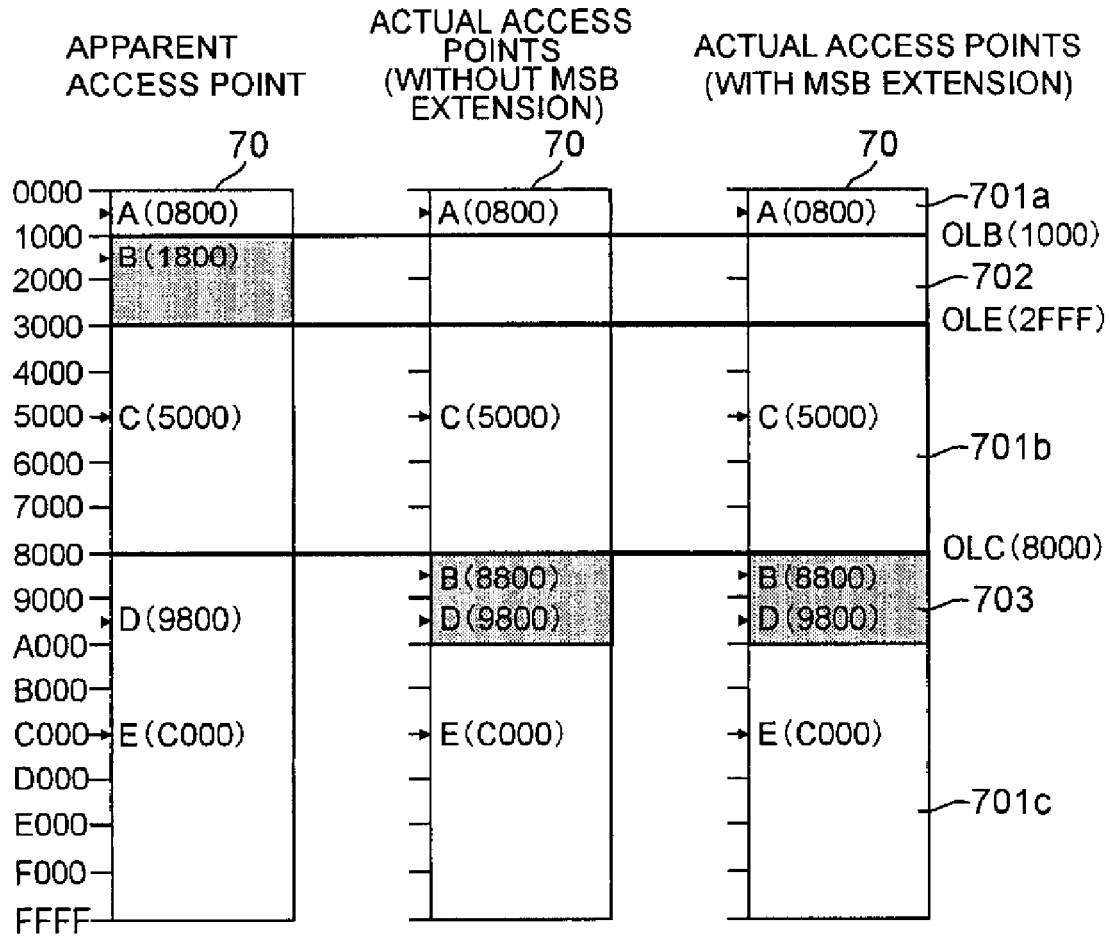
FIG. 7 is a diagram for describing the purpose of the MSB extension according to one implementation of the present invention.

FIG. 7 is the case that the entire address space of the data memory 70 is defined within a range from "0000h" and "FFFFh" and shows how the address conversion is performed for the access points to the data memory 70 when MSB extension of "1'b0" is not performed and when MSB extension of "1'b0" is performed in each address if the OLB address, the OLE address, and the OLC address are set to "1000h", "2FFFh", and "8000h", respectively.

The left side of FIG. 7 shows positions of the specified addresses generated in the address generating circuit 50 (apparent access points). The middle of FIG. 7 shows positions of the substitution destination addresses (actual access points) if calculations are performed in the subtracters 605, 606 when the MSB extension of "1'b0" is not performed in each address. The right side of FIG. 7 shows positions of the substitution destination addresses (actual access points) if calculations are performed in the subtracters 605, 606 when the MSB extension of "1'b0" is performed in each address.

Since the OLB address is "1000h" and the OLE address is "2FFFh", the substitution source region 702 is a range of "2000h". The substitution destination region 703 is a range from "8000h" of the OLC address to "9FFFh", which is obtained by adding the range "2000h" of the substitution source region 702 thereto. Therefore, an example shown in FIG. 7 is the case that the substitution source region 702 and the substitution destination region 703 correspond to a half or less of the entire range "FFFFh" of the data memory 70.

===Case of Specified Address A (0800h)===

If the specified address generated in the address generating circuit 50 is "0008h" (specified address A), when the MSB is not extended and is extended, each difference of the subtracters 605, 606 is as follows.

Difference "Specified Address–OLB Address" of the Subtracter 605
(Without MSB extension): "0800h"–"1000h"="F800h"
(With MSB extension): "00800h"–"01000h"="1F800h"
Difference "OLE Address–Specified Address" of the Subtracter 606
(Without MSB extension): "2FFFh"–"0800h"="27FFh"
(With MSB extension): "02FFFh"–"00800h"="027FFh"

Therefore, the MSB of the difference of the subtracter 605 is "1 (negative)" in both cases of extending the MSB and not extending the MSB. The MSB of the difference of the subtracter 606 is "0 (positive)" in both cases of extending the MSB and not extending the MSE. As a result, the AND element 608 is closed in both cases of extending the MSB and not extending the MSB and makes the selecting circuit 609 select the specified address A (0800h)

===Case of Specified Address B (1800h)===
If the specified address generated in the address generating circuit 50 is "1800h" (specified address B), when the MSB is not extended and is extended, each difference of the subtracters 605, 606 is as follows.

Difference "Specified Address–OLB Address" of the Subtracter 605
(Without MSB extension): "1800h"–"1000h"="0800h"
(With MSB extension): "01800h"–"01000h"="00800h"
Difference "OLE Address–Specified Address" of the Subtracter 606
(Without MSB extension): "2FFFh"–"1800h"="17FFh"
(With MSB extension): "02FFFh"–"01800h"="017FFh"

Therefore, the MSB of the difference of the subtracter 605 is "0 (positive)" in both cases of extending the MSB and not extending the MSB. The MSB of the difference of the subtracter 606 is "0 (positive)" in both cases of extending the MSB and not extending the MSB. As a result, the AND element 608 is opened in both cases of extending the MSB and not extending the MSB and makes the selecting circuit 609 select a substitution destination address B, which is an addition result of the adder 607. The substitution destination address B is "8800h" as below.

Addition Result "OLC Address+Specified Address–OLB Address" of the Adder 607

"8000h"+"0800h"="8800h"

===Case of Specified Address C (5000h)===
If the specified address generated in the address generating circuit 50 is "5000h" (specified address C), when the MSB is not extended and is extended, each difference of the subtracters 605, 606 is as follows.

Difference "Specified Address–OLB Address" of the Subtracter 605
(Without MSB extension): "5000h"–"1000h"="4000h"
(With MSB extension): "05000h"–"01000h"="04000h"
Difference "OLE Address–Specified Address" of the Subtracter 606
(Without MSB extension): "2FFFh"–"5000h"="DFFFh"
(With MSB extension): "02FFFh"–"05000h"="1DFFFh"

Therefore, the MSB of the difference of the subtracter 605 is "0 (positive)" in both cases of extending the MSB and not extending the MSB. The MSB of the difference of the subtracter 606 is "1 (negative)" in both cases of extending the MSB and not extending the MSB. As a result, the AND element 608 is closed in both cases of extending the MSB and not extending the MSB and makes the selecting circuit 609 select the specified address C (5000h).

===Case of Specified Address D (9800h)===
If the specified address generated in the address generating circuit 50 is "9800h" (specified address D), when the MSB is not extended and is extended, each difference of the subtracters 605, 606 is as follows.

Difference "Specified Address–OLB Address" of the Subtracter 605
(Without MSB extension): "9800h"–"1000h"="8800h"
(With MSB extension): "09800h"–"01000h"="08800h"
Difference "OLE Address–Specified Address" of the Subtracter 606
(Without MSB extension): "2FFFh"–"9800h"="97FFh"
(With MSB extension): "02FFFh"–"09800h"="197FFh"

Therefore, the MSB of the difference of the subtracter 605 is "1 (positive)" in the case of not extending the MSB and is "0 (positive)" in the case of extending the MSB. The MSB of the difference of the subtracter 606 is "1 (negative)" in both cases of extending the MSB and not extending the MSB. As a result, the AND element 608 is closed in both cases of extending the MSB and not extending the MSB and makes the selecting circuit 609 select the specified address D (9800h).

===Case of Specified Address E (C000h)===
If the specified address generated in the address generating circuit 50 is "C000h" (specified address E), when the MSB is not extended and is extended, each difference of the subtracters 605, 606 is as follows.

Difference "Specified Address–OLB Address" of the Subtracter 605
(Without MSB extension): "C000h"–"1000h"="B800h"
(With MSB extension): "0C000h"–"01000h"="0B800h"
Difference "OLE Address–Specified Address" of the Subtracter 606
(Without MSB extension): "2FFFh"–"C000h"="6FFFh"
(With MSB extension): "02FFFh"–"0C000h"="16FFFh"

Therefore, the MSB of the difference of the subtracter 605 is "1 (positive)" in the case of not extending the MSB and is "0 (positive)" in the case of extending the MSB. The MSB of the difference of the subtracter 606 is "0 (negative)" in the case of not extending the MSB and is "1 (negative)" in the case of extending the MSB. As a result, the AND element 609 is closed in both cases of extending the MSB and not extending the MSB and makes the selecting circuit 609 select the specified address E (C000h).

In this way, when the substitution source region 702 and the substitution destination region 703 correspond to a half or less of the entire range "FFFFh" of the data memory 70, a problem does not occur in each case of the specified addresses A to E if the MSB is not extended in each address of the OLB address, the OLE address, and the specified address, and the address conversion intended in the present invention is performed.

Figure 8:
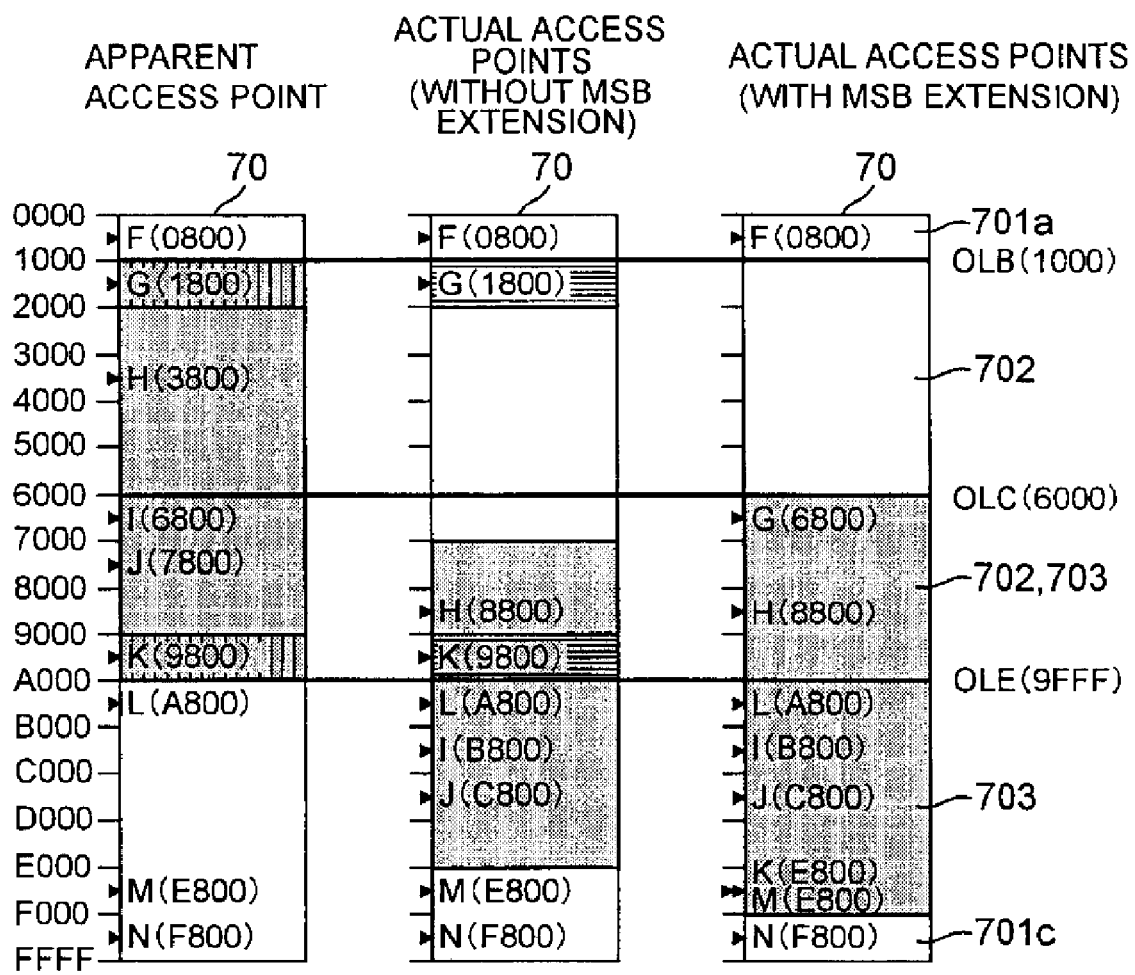
FIG. 8 is a diagram for describing the purpose of the MSB extension according to one implementation of the present invention.

<<When Problem Occurs Unless MSB is Extended>>
FIG. 8 is the case that the entire address space of the data memory 70 is defined within a range from "0000h" and "FFFFh" and shows how the address conversion is performed for the access points to the data memory 70 when MSB extension of "1'b0" is not performed and when MSB extension of "1'b0" is performed in each address if the OLB address, the OLE address, and the OLC address are set to "1000h", "9FFFh", and "6000h", respectively.

The left side of FIG. 8 shows positions of the specified addresses generated in the address generating circuit 50 (apparent access points). The middle of FIG. 8 shows positions of the substitution destination addresses (actual access points) if calculations are performed in the subtracters 605,

606 when the MSB extension of "1'b0" is not performed in each address. The right side of FIG. 8 shows positions of the substitution destination addresses (actual access points) if calculations are performed in the subtracters 605, 606 when the MSB extension of "1'b0" is performed in each address.

Since the OLB address is "1000h" and the OLE address is "9FFFh", the substitution source region 702 is a range of "9000h". The substitution destination region 703 is a range from "6000h" of the OLC address to "EFFFh", which is obtained by adding the range "9000h" of the substitution source region 702 thereto. Therefore, an example shown in FIG. 7 is the case that the substitution source region 702 and the substitution destination region 703 are greater than a half of the entire range "FFFFh" of the data memory 70.

===Case of Specified Address F (0800h)===

If the specified address generated in the address generating circuit 50 is "0800h" (specified address F), when the MSB is not extended and is extended, each difference of the subtracters 605, 606 is as follows.

Difference "Specified Address−OLB Address" of the Subtracter 605

(Without MSB extension): "0800h"−"1000h"="F800h"

1s (With MSB extension): "00800h"−"01000h"="1F800h"

Difference "OLE Address−Specified Address" of the Subtracter 606

(Without MSB extension): "9FFFh"−"0800h"="97FFh"

(With MSB extension): "09FFFh"−"00800h"="097FFh"

Therefore, the MSB of the difference of the subtracter 605 is "1 (negative)" in both cases of extending the MSB and not extending the MSB. The MSB of the difference of the subtracter 606 is "1 (positive)" in the case of not extending the MSB and "0 (positive)" in the case of extending the MSB. As a result, the AND element 608 is closed in both cases of extending the MSB and not extending the MSB and makes the selecting circuit 609 select the specified address A (0800h)

===Case of Specified Address G (1800h)===

If the specified address generated in the address generating circuit 50 is "1800h" (specified address G), when the MSB is not extended and is extended, each difference of the subtracters 605, 606 is as follows.

Difference "Specified Address−OLB Address" of the Subtracter 605

(Without MSB extension): "1800h"−"1000h"="0800h"

(With MSB extension): "01800h"−"01000h"="00800h"

Difference "OLE Address−Specified Address" of the Subtracter 606

(Without MSB extension): "9FFFh"−"1800h"="87FFh"

(With MSB extension): "09FFFh"−"01800h"="087FFh"

Therefore, the MSB of the difference of the subtracter 605 is "0 (positive)" in both cases of extending the MSB and not extending the MSB. The MSB of the difference of the subtracter 606 is "1 (positive)" in the case of not extending the MSB and "0 (positive)" in the case of extending the MSB. As a result, the AND element 608 is closed in the case of not extending the MSB and makes the selecting circuit 609 select the specified address G (1800h), which is different from the address intended in the present invention. The AND element 608 is opened in the case of extending the MSB and makes the selecting circuit 609 select the substitution destination address G, which is an addition result of the adder 607 and which is intended in the present invention. The substitution destination address G is "6800h" as below.

Addition Result "OLC Address+Specified Address−OLB Address" of the Adder 607

"6000h"+"0800h"="6800h"

===Case of Specified Address H (3800h)===

If the specified address generated in the address generating circuit 50 is "3800h" (specified address H), when the MSH is not extended and is extended, each difference of the subtracters 605, 606 is as follows.

Difference "Specified Address−OLB Address" of the Subtracter 605

(Without MSB extension): "3800h"−"1000h"="2800h"

(With MSB extension): "03800h"−"01000h"="02800h"

Difference "OLE Address−Specified Address" of the Subtracter 606

(Without MSB extension): "9FFFh"−"3800h"="67FFh"

(With MSB extension): "09FFFh"−"03800h"="067FFh"

Therefore, the MSB of the difference of the subtracter 605 is "0 (positive)" in both cases of extending the MSB and not extending the MSB. The MSB of the difference of the subtracter 606 is "0 (positive)" in both cases of extending the MSB and not extending the MSB. As a result, the AND element 608 is opened in both cases of extending the MSB and not extending the MSB and makes the selecting circuit 609 select the substitution destination address H, which is an addition result of the adder 607. The substitution destination address H is "8800h" as below.

Addition Result "OLC Address+Specified Address−OLB Address" of the Adder 607

"6000h"+"2800h"="8800h"

===Case of Specified Address I (6800h)===

If the specified address generated in the address generating circuit 50 is "6800h" (specified address I), when the MSB is not extended and is extended, each difference of the subtracters 605, 606 is as follows.

Difference "Specified Address−OLB Address" of the Subtracter 605

(Without MSB extension): "6800h"−"1000h"="5800h"

(With MSB extension): "06800h"−"01000h"="05800h"

Difference "OLE Address−Specified Address" of the Subtracter 606

(Without MSB extension): "9FFFh"−"6800h"="37FFh"

(With MSB extension): "09FFFh"−"06800h"="037FFh"

Therefore, the MSB of the difference of the subtracter 605 is "0 (positive)" in both cases of extending the MSB and not extending the MSB. The MSB of the difference of the subtracter 606 is "0 (positive)" in both cases of extending the MSB and not extending the MSB. As a result, the AND element 608 is opened in both cases of extending the MSB and not extending the MSB and makes the selecting circuit 609 select the substitution destination address I, which is an addition result of the adder 607. The substitution destination address I is "B800h" as below.

Addition Result "OLC Address+Specified Address−OLB Address" of the Adder 607

"6000h"+"5800h"="B800h"

===Case of Specified Address J (7800h)===

If the specified address generated in the address generating circuit 50 is "7800h" (specified address J), when the MSB is not extended and is extended, each difference of the subtracters 605, 606 is as follows.

Difference "Specified Address−OLB Address" of the Subtracter 605

(Without MSB extension): "7800h"−"1000h"="6800h"

(With MSB extension): "07800h"−"0100h"="06800h"

Difference "OLE Address−Specified Address" of the Subtracter 606

(Without MSB extension): "9FFFh"−"7800h"="27FFh"

(With MSB extension): "09FFFh"−"07800h"="027FFh"

Therefore, the MSB of the difference of the subtracter 605 is "0 (positive)" in both cases of extending the MSB and not extending the MSB. The MSB of the difference of the subtracter 606 is "0 (positive)" in both cases of extending the MSB and not extending the MSB. As a result, the AND element 608 is opened in both cases of extending the MSB and not extending the MSB and makes the selecting circuit 609 select the substitution destination address J, which is an addition result of the adder 607. The substitution destination address J is "C800h" as below.

Addition Result "OLC Address+Specified Address−OLB Address" of the Adder 607

"6000h"+"6800h"="C800h"

===Case of Specified Address K (9800h)===

If the specified address generated in the address generating circuit 50 is "9800h" (specified address K), when the MSB is not extended and is extended, each difference of the subtracters 605, 606 is as follows.

Difference "Specified Address−OLB Address" of the Subtracter 605
 (Without MSB extension): "9800h"−"1000h"="8800h"
 (With MSB extension): "09800h"−"01000h"="08800h"
Difference "OLE Address−Specified Address" of the Subtracter 606
 (Without MSB extension): "9FFFh"−"9800h"="07FFh"
 (With MSB extension): "09FFFh"−"09800h"="007FFh"

Therefore, the MSB of the difference of the subtracter 605 is "1" in the case of not extending the MSB and "0 (positive)" in the case of extending the MSB. The MSB of the difference of the subtracter 606 is "0 (positive)" in both cases of extending the MSB and not extending the MSB. As a result, the AND element 608 is closed in the case of not extending the MSB and makes the selecting circuit 609 select the specified address K (9800h), which is different from the address intended in the present invention. The AND element 608 is opened in the case of extending the MSB and makes the selecting circuit 609 select the substitution destination address K, which is an addition result of the adder 607 and which is intended in the present invention. The substitution destination address K is "E800h" as below.

Addition Result "OLC Address+Specified Address−OLB Address" of the Adder 607

"6000h"+"8800h"="E800h"

===Case of Specified Address L (A800h)===

If the specified address generated in the address generating circuit 50 is "A800h" (specified address L), when the MSB is not extended and is extended, each difference of the subtracters 605, 606 is as follows.

Difference "Specified Address−OLB Address" of the Subtracter 605
 (Without MSB extension) "A800h"−"1000h"="9800h"
 (With MSB extension): "0A800h"−"01000h"="09800h"
Difference "OLE Address−Specified Address" of the Subtracter 606
 (Without MSB extension): "9FFFh"−"A800h"="1F7FFh"
 (With MSB extension): "09FFFh"−"0A800h"="1F7FFh"

Therefore, the MSB of the difference of the subtracter 605 is "1 (positive)" in the case of not extending the MSB and "0 (positive)" in the case of extending the MSB. The MSB of the difference of the subtracter 606 is "1 (negative)" in both cases of extending the MSB and not extending the MSB. As a result, the AND element 608 is closed in both cases of extending the MSB and not extending the MSB and makes the selecting circuit 609 select the specified address L (A800h).

===Case of Specified Address M (E800h)===

If the specified address generated in the address generating circuit 50 is "E800h" (specified address M), when the MSB is not extended and is extended, each difference of the subtracters 605, 606 is as follows.

Difference "Specified Address−OLB Address" of the Subtracter 605
 (Without MSB extension): "E800h"−"1000h"="D800h"
 (With MSB extension): "0E800h"−"01000h"="0D800h"
Difference "OLE Address−Specified Address" of the Subtracter 606
 (Without MSB extension): "9FFFh"−"E800h"="B7FFh"
 (With MSB extension): "09FFFh"−"0E800h"="1B7FFh"

Therefore, the MSB of the difference of the subtracter 605 is "1 (positive)" in the case of not extending the MSB and "0 (positive)" in the case of extending the MSB. The MSB of the difference of the subtracter 606 is "1 (negative)" in both cases of extending the MSB and not extending the MSB. As a result, the AND element 608 is closed in both cases of extending the MSB and not extending the MSB and makes the selecting circuit 609 select the specified address M (E800h).

===Case of Specified Address N (F800h)===

If the specified address generated in the address generating circuit 50 is "E800h" (specified address N), when the MSB is not extended and is extended, each difference of the subtracters 605, 606 is as follows.

Difference "Specified Address−OLB Address" of the Subtracter 605
 (Without MSB extension): "F800h"−"1000h"="E800h"
 (With MSB extension): "0F800h"−"01000h"−"0E800h"
Difference "OLE Address−Specified Address" of the Subtracter 606
 (Without MSB extension): "9FFFh"−"F800h"="A7FFh"
 (With MSB extension): "09FFFh"−"0F800h"="0A7FFh"

Therefore, the MSB of the difference of the subtracter 605 is "1 (positive)" in the case of not extending the MSB and "0 (positive)" in the case of extending the MSB. The MSB of the difference of the subtracter 606 is "1 (negative)" in both cases of extending the MSB and not extending the MSB. As a result, the AND element 60B is closed in both cases of extending the MSB and not extending the MSB and makes the selecting circuit 609 select the specified address M (F800h).

In this way, if the substitution source region 702 and the substitution destination region 703 are greater than a half of the entire range "FFFFh" of the data memory 70, the address conversion intended in the present invention may not performed unless the MSB is not extended in each address of the OLB address, the OLE address, and the specified address. For example, as described above, in the cases of the specified address g (1800h) and the specified address K (9800h), which should be converted to the substitution addresses G (6800h) and the substitution destination address K (E800h), since such conversion is not performed, it is problematic that the data memory 70 is accessed at the specified address C (1800h) and the specified address K (9800h) without modification. Therefore, the MSB of 1'b0 must be extended in each address of the OLB address, the OLE address, and the specified address.

<<MSB Extending Unit of Address Converting Circuit>>

As described above, if the substitution source region 702 set between the OLB address and the OLE address is greater that a half of the entire region provided by the data memory 70, the address conversion intended in the present invention is not performed. Therefore, the address converting circuit 60 shown in FIG. 3 is provided with extension bit registers 611a to 611c and MSB extending units 612a to 612c.

The extension bit registers 611a to 611c are registers for storing 1'b0 ("0" of one bit).

The MSB extending unit 612a ("first MSB extending unit") adds 1'b0 stored in the extension bit register 611a to the MSB (most significant bit) of the N-bit specified address generated in the address generating circuit 50. That is, the specified address is extended from N-bit to "N+1" bit.

The MSB extending unit 612b ("second MSH extending unit") adds 1'b0 stored in the extension hit register 611b to the MSB (most significant bit) of the N-bit OLB address stored in the OLB register 602. That is, the OLB address is extended from N-bit to "N+1" bit.

The MSD extending unit 612c ("third MSB extending unit") adds 1'b0 stored in the extension bit register 611c to the MSB (most significant bit) of the N-bit OLE address stored in the OLE register 603. That is, the OLE address is extended from N-bit to "N+1" bit.

After extending each of the specified address, the OLB address, and the OLE address from N-bit to "N+1" bit, the subtracter 605 calculates the difference "specified address–OLB address" between the specified address and the OLB address that are extended to "N+1" bit, and the subtracter 606 calculates the difference "OLE address–specified address" between the OLE address and the specified address that are extended to "N+1" bit. Therefore, both the difference "the specified address–OLB address" of the subtracter 605 and the difference "GOE address–specified address" of the subtracter 606 are "N+1" bit.

The adder 607 adds the N-bit OLC address stored in the OLC register 601 and N bits of the "N+1" bit difference "specified address–OLB address" of the subtracter 605, excluding the MSB. Therefore, the selecting circuit 609 selects the N-bit specified address before the bit extension or the N-bit substitution destination address, which is the addition result of the adder 607. The AND element 608 inputs the MSBs of the "N+1" bit differences of the subtracters 605, 606 and determines based on each MSB whether the specified address is included between the OLB address and the OLE address.

By providing such an arrangement, the address conversion intended in the present invention is certainly performed.

Description has been made hereinabove of the illustrative and currently preferred implementations of the present invention, the concept of the present invention can be changed variously for implementation and application, and the appended claims include various modifications except insofar as limited by the prior art.

What is claimed is:

1. A memory address generating apparatus that is disposed in a processor, the memory address generating apparatus generating an address of an access destination to a memory that is accessible by the processor, the memory address generating apparatus comprising:
   an address converting circuit, after setting a first setting region storing substitution source data and a second setting region storing substitution destination data that are a substitution target of the substitution source data in an address space provided by the memory, if a specified address specified by the processor as the access destination to the memory lies between a first beginning address and an end address of the first setting region, changing the specified address to a substitution destination address generated by adding a difference between the specified address and the first beginning address to a second beginning address of the second setting region,
   wherein if the specified address lies between the first beginning address and the end address, the substitution destination data in the second setting region corresponding to the substitution destination address is substituted for the substitution source data in the first setting region corresponding to the specified address.

2. The memory address generating apparatus of claim 1, wherein the first setting region and the second setting region have the same capacity.

3. The memory address generating apparatus of claim 1, wherein the address converting circuit includes:
   a first address register that sets the first beginning address;
   a second address register that sets the end address; and
   a third address register that sets the second beginning address.

4. The memory address generating apparatus of claim 1, wherein the address converting circuit includes:
   a first subtracter that calculates a first difference between the specified address and the first beginning address;
   a second subtracter that calculates a second difference between the end address and the specified address;
   an adder that adds the second beginning address and the first difference to generate the substitution destination address;
   a selecting circuit that selects the specified address or the substitution destination address; and
   a selection control circuit that controls the selecting circuit based on a positive or negative sign bit of each of the first difference and the second difference to select the substitution destination address if it is determined that the specified address is included between the first beginning address and the end address and to select the specified address if it is determined that the specified address is not included between the first beginning address and the end address.

5. The memory address generating apparatus of claim 4, wherein the address converting circuit includes:
   a first MSB extending unit that adds "0" of one bit as the MSB of the specified address;
   a second MSB extending unit that adds "0" of one bit as the MSB of the first beginning address; and
   a third MSB extending unit that adds "0" of one bit as the MSB of the end address,
   wherein the first subtracter calculates the first difference between the specified address added with the "0" of the one bit and the first beginning address added with the "0" of the one bit, and
   wherein the second subtracter calculates the second difference between the end address added with the "0" of the one bit and the specified address added with the "0" of the one bit.

6. The memory address generating apparatus of claim 4, wherein the address converting circuit includes an enable flag register that stores an enable flag setting whether the substitution destination data is substituted for the substitution source data or not, and
   wherein the selection control circuit performs control based on the enable flag stored in the enable flag register to enable the selecting circuit to select the specified address or the substitution destination address if the enable flag indicates that the substitution is performed and to enable the selecting circuit to select only the specified address if the enable flag indicates that the substitution is not performed.

7. The memory address generating apparatus of claim 1,
   wherein the address space provided by the memory is constituted only by an address space of a ROM,
   wherein the first setting region and the second setting region are set within the address space of the ROM,
   wherein when using static data that are common contents and dynamic data that are different contents in a plurality of processes, the substitution source data stored in the first setting region are representative data of the plurality of the dynamic data, and wherein the substitution destination data stored in the second setting region are the dynamic data other than the representative data.

8. The memory address generating apparatus of claim 1, wherein the address space provided by the memory is constituted only by combining an address space of a ROM and an address space of a RAM, wherein the first setting region and the second setting region are set within the address space of the ROM and the address space of the RAM, respectively, wherein the substitution source data stored in the first setting region are bug data where a bug is created, and wherein the substitution destination data stored in the second setting region are bug correction data with the bug corrected.

9. A processor comprising an address converting circuit, after setting a first setting region storing substitution source data and a second setting region storing substitution destination data that are a substitution target of the substitution source data in an address space that can be accessed by the processor, if a specified address specified by the processor as the access destination to the memory lies between a first beginning address and an end address of the first setting region, changing the specified address to a substitution destination address generated by adding a difference between the specified address and the first beginning address to a second beginning address of the second setting region, wherein if the specified address lies between the first beginning address and the end address, the substitution destination data in the second setting region corresponding to the substitution destination address is substituted for the substitution source data in the first setting region corresponding to the specified address.

10. The processor of claim 9, wherein the processor is a DSP (Digital Signal Processor) and wherein the memory is a program memory or a data memory.

11. The memory address generating method generating an address of an access destination to a memory that can be accessed by a processor, the memory address generating method comprising the steps of:

setting a first setting region storing substitution source data and a second setting region storing substitution destination data that are substituted for the substitution source data in an address space provided by the memory;

if a specified address specified by the processor as the access destination to the memory is included between a first beginning address and an end address of the first setting region, changing the specified address to a substitution destination address generated by adding a difference between the specified address and the first beginning address to a second beginning address of the second setting region; and substituting the substitution destination data in the second setting region corresponding to the substitution destination address for the substitution source data in the first setting region corresponding to the specified address by the access based on the substitution destination address.

* * * * *